United States Patent
Brown

(10) Patent No.: US 8,611,254 B2
(45) Date of Patent: Dec. 17, 2013

(54) SYSTEMS AND METHODS FOR CONFIGURING A NETWORK FOR MULTICASTING

(75) Inventor: Jeremy Brown, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1964 days.

(21) Appl. No.: 11/590,120

(22) Filed: Oct. 31, 2006

(65) Prior Publication Data

US 2008/0101361 A1    May 1, 2008

(51) Int. Cl.
*H04L 12/28* (2006.01)

(52) U.S. Cl.
USPC .......................................... 370/255; 370/390

(58) Field of Classification Search
USPC ........................................................ 370/390
See application file for complete search history.

(56) References Cited

U.S. PATENT DOCUMENTS

| | | | |
|---|---|---|---|
| 6,526,054 B1* | 2/2003 | Li et al. | 370/390 |
| 7,471,645 B2* | 12/2008 | Torres et al. | 370/256 |
| 2003/0193958 A1* | 10/2003 | Narayanan | 370/400 |
| 2004/0218536 A1* | 11/2004 | Yasukawa et al. | 370/238 |
| 2005/0220074 A1* | 10/2005 | Kawamura et al. | 370/351 |
| 2006/0088031 A1* | 4/2006 | Nalawade | 370/390 |
| 2006/0182049 A1* | 8/2006 | Rokui | 370/312 |
| 2006/0291444 A1* | 12/2006 | Alvarez et al. | 370/351 |
| 2007/0165632 A1* | 7/2007 | Zwiebel | 370/390 |
| 2008/0101360 A1* | 5/2008 | Napierala | 370/390 |

OTHER PUBLICATIONS

Estrin et al, RFC 2362: PIM-SM: Protocol Specification, Jun. 1998, The Internet Society.*

* cited by examiner

*Primary Examiner* — Andrew Chriss

(57) ABSTRACT

In one embodiment, a method for configuring a network for multicasting includes receiving with a first router a first message from a second router, updating a listing of candidate rendezvous points on the first router in relation to information contained in the first message, and sending a second message from the first router to a third router, the second message containing information as to rendezvous point mapping.

28 Claims, 9 Drawing Sheets

SYSTEMS AND METHODS FOR CONFIGURING A NETWORK FOR MULTICASTING

BACKGROUND

Multicasting is a method of forwarding streaming data to a group of interested receivers in a domain, such as a wide area network (WAN). By way of example, multicasting can be used to deliver streaming audio and/or streaming video to particular clients within the domain. Such streaming audio or video may, for instance, be used to for video conferencing purposes.

One routing protocol often used in multicasting is the protocol-independent multicast sparse mode (PIM-SM) protocol. In that protocol, unidirectional shared trees rooted at a rendezvous point (RP) are built such that the RP functions, at least initially, as an intermediary between the sender of the streaming data and the various receivers of the streaming data. In a typical scenario, a single router within the domain is designated as the RP for a given range of group multicast addresses, each of which can be used to transmit a separate stream of data. Each group multicast address can be analogized to a television channel over which particular data is broadcast. The RP router receives requests from receivers, i.e., clients within the domain, that wish to receive a data stream that will be transmitted over one of the multicast addresses. In response to the requests, the RP router transmits the data traffic received from the sender to each requesting client. In such a case, the various clients need not know the address or network identity of the sender.

Before a given router is designated as an RP, several candidate RPs (C-RPs) are designated. Multiple candidates for RP are designated in case one or more of the routers fail for some reason, for example crash or lose connection to the network.

Within PIM-SM, a single bootstrap router (BSR) is often used to inform the other routers within the domain as to which routers within the domain are C-RPs. Through use of a BSR and the associated BSR protocol, the routers within the domain can be automatically configured to recognize the C-RPs. Although the automation provided by BSRs is convenient, the use of BSRs can be disadvantageous. For example, if the BSR fails (e.g., crashes or loses network connection), the BSR cannot inform the routers within the domain as to which routers are C-RPs.

A further disadvantage associated with use of PIM BSR relates to C-RP failure. In particular, if a C-RP fails, it may take a relatively long time for each router in the domain to discover the failure. The reason for the delay in discovering a C-RP failure can be better understood with reference to a brief example. Within the BSR protocol, the BSR receives periodic messages from the C-RPs within the domain as indications that the C-RPs are still operable and are connected to the network. When a C-RP fails, however, the BSR will only discover that the C-RP is unavailable after no longer receiving messages from the C-RP. Normally, the BSR will wait a time period longer than the C-RP periodic message interval before concluding that the C-RP is no longer available. For example, the BSR may wait 2.5 times the C-RP periodic message interval before arriving to that conclusion. If the interval is, for example, one minute, the BSR may not discover that the C-RP is unavailable until 2.5 minutes have passed.

After the BSR determines that the C-RP is no longer available, the BSR will stop sending periodic messages to the other routers within the domain that confirm the availability of the C-RP. Unfortunately, those other routers will, like the BSR, only themselves conclude that the C-RP is unavailable after another extended time period (e.g., another 2.5 times the BSR periodic message interval) has passed. Assuming a one minute periodic message interval for the BSR and the 2.5 multiple, the various routers of the network may not time out the entry for the C-RP until another 2.5 minutes have passed, potentially resulting in a full 5 minutes passing after the C-RP has failed before all routers are reconfigured.

SUMMARY

Disclosed are systems and methods for configuring a network for multicasting. In one embodiment, a method for configuring a network for multicasting includes receiving with a first router a first message from a second router, the first message containing at least one mapping of a candidate rendezvous point available on the network, updating a listing of candidate rendezvous points on the first router in relation to the at least one mapping contained in the first message, and sending a second message from the first router to a third router, the second message containing at least one candidate rendezvous point mapping from the listing of candidate rendezvous points on the first router.

In another embodiment, a method for configuring a network for multicasting includes receiving with a first router a first message from a second router, the first message containing a remove command that indicates to the first router to remove a mapping of a candidate rendezvous point from a listing of candidate rendezvous points stored on the first router, removing the mapping of the candidate rendezvous point from the listing of candidate rendezvous points on the first router in response to the received remove command, and sending a second message from the first router to a third router, the second message containing a remove command indicating to the third router to remove the candidate rendezvous point mapping from its listing of candidate rendezvous points.

BRIEF DESCRIPTION OF THE DRAWINGS

The components in the drawings are not necessarily to scale, emphasis instead being placed upon clearly illustrating the principles of the present disclosure. In the drawings, like reference numerals designate corresponding parts throughout the several views.

DETAILED DESCRIPTION

As described above, PIM BSR protocol is disadvantageous at least because routers within a network cannot be informed as to which routers are C-RPs when the BSR fails and recovery after C-RP failure may take a relatively long time. As described in the following, however, such disadvantages can be overcome or at least decreased in effect by using an alternative protocol in which a BSR is not relied upon to configure the routers of the network. In some embodiments, messages pertaining to RP mapping are propagated through the network from router to router, thereby obviating the need for a BSR. In addition, messages pertaining to C-RP failure are propagated through the network from router to router immediately upon discovery of the failure by one or more of the routers. In such embodiments, failure of a BSR will not adversely affect configuration of the network routers and recovery after a C-RP failure can be achieved more quickly.

Figure 1:
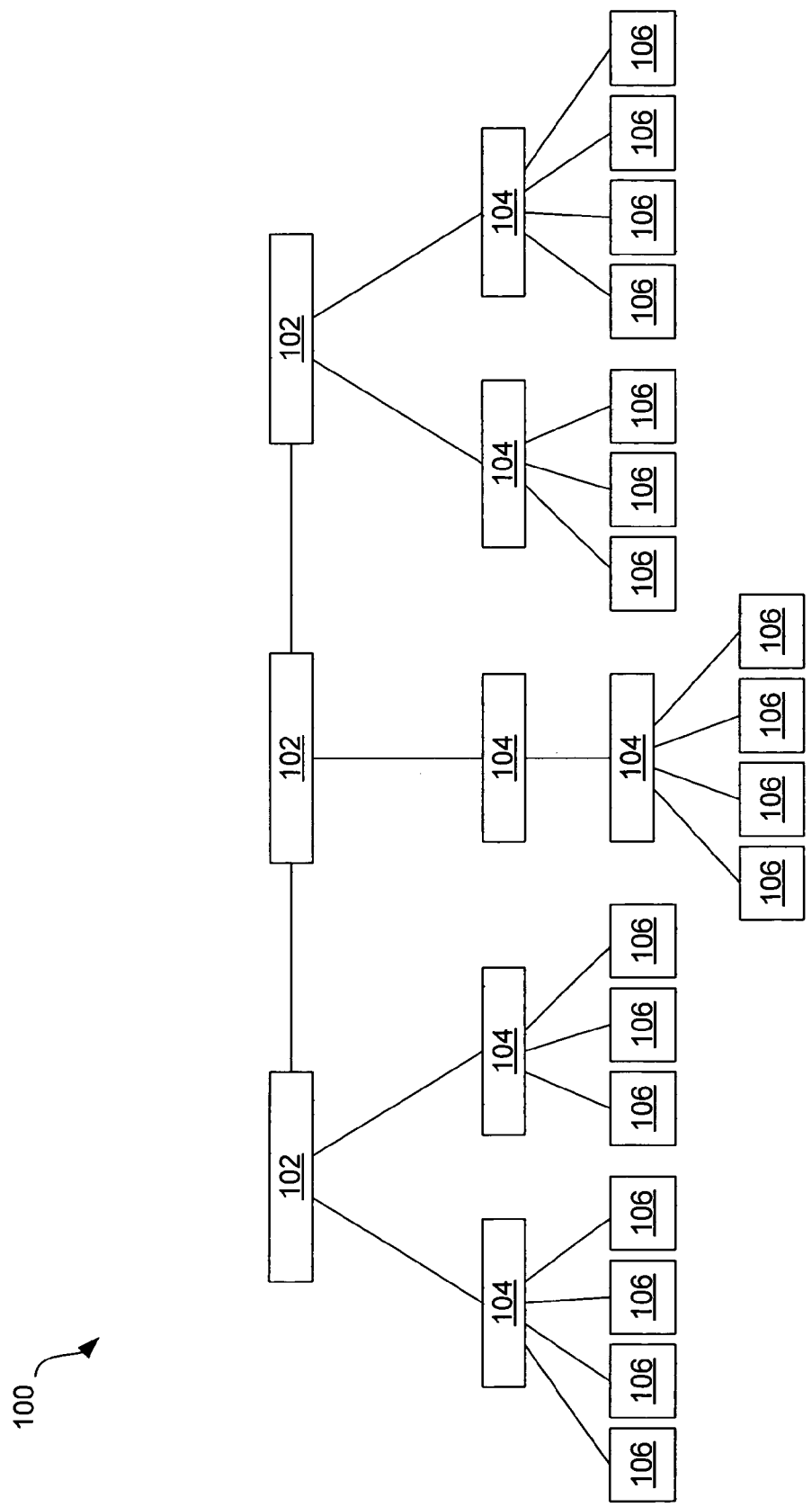
FIG. 1 is block diagram of an embodiment of a domain over which multicasting can be performed.

Referring now to the drawings, in which like numerals indicate corresponding parts throughout the several views, FIG. 1 illustrates an example domain 100 over which multicasting can be performed. As indicated in that figure, the domain 100 comprises a network, for example WAN, that comprises multiple network routers 102 that are associated with separate sub-networks, for example local area networks (LANs), that include various network switches 104 and client devices 106. By way of example, the client devices 106 comprise client computers and/or servers that can receive and present streaming audio and/or video that is the subject of a multicast. Notably, however, the client devices are not limited to client computers and servers.

As indicated in FIG. 1, the routers 102 are linked to each other within the domain 100. Accordingly, each router 102 is in communication with at least one neighboring router such that messages can be propagated through the domain 100 from router to router. Although not depicted in FIG. 1, each router 102 can further be connected to another network, including the Internet.

Figure 2:
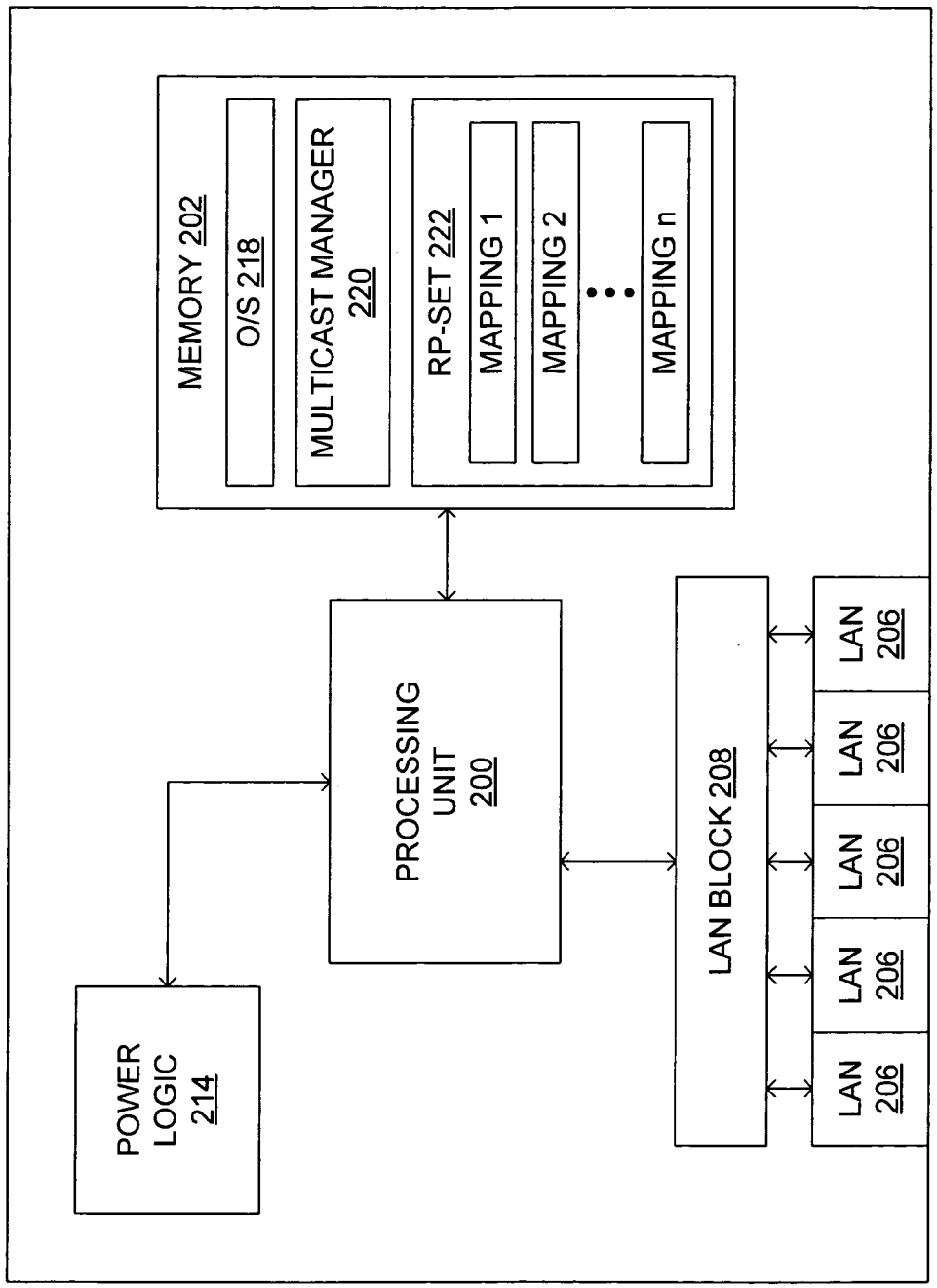
FIG. 2 is a block diagram of an embodiment of a network router shown in FIG. 1.

FIG. 2 is a block diagram illustrating an example architecture a the router 102 shown in FIG. 1. In some embodiments, each router 102 can have a generally similar configuration and each qualifies as a PIM-SM router such that streaming data can be transmitted to any one of the client devices 106 within the domain 100. Furthermore, any one of the routers 102 can function as a C-RP or RP.

As indicated in FIG. 2, the router 102 comprises a processing unit 200 that can comprise a microprocessor or one or more application specific integrated circuits (ASICs) that is/are configured to execute instructions stored in memory 202 of the router. The memory 202 comprises, for example, one or more volatile (e.g., random access memory (RAM)) elements and one or more nonvolatile (e.g., flash memory) elements.

The router 102 further includes multiple LAN interfaces 206 that are used to connect the router to various switches and/or client devices. Each of the LAN interfaces 206 can, for example, be connected to a LAN block 208, such as an Ethernet block. The router 102 of FIG. 2 also comprises power logic 214 that manages the power supplied to the router.

Stored in memory 202 is an operating system 218 that comprises the instructions that control the general operation of the router 102. In addition, stored in memory 202 is a multicast manager 220 that is used to update group RP (G-RP) mappings stored within an RP-Set 222. In addition, the multicast manager 220 is configured to transmit and receive RP-Set messages to and from neighboring routers. Therefore, as described in greater detail below, the multicast manager 220 can be used to propagate C-RP information, including C-RP discovery and C-RP failure information, throughout a domain.

Various programs (i.e. logic) have been described herein. The programs can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, operation of the systems will now be discussed. In the discussions that follow, flow diagrams are provided. Process steps or blocks in the flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 3:
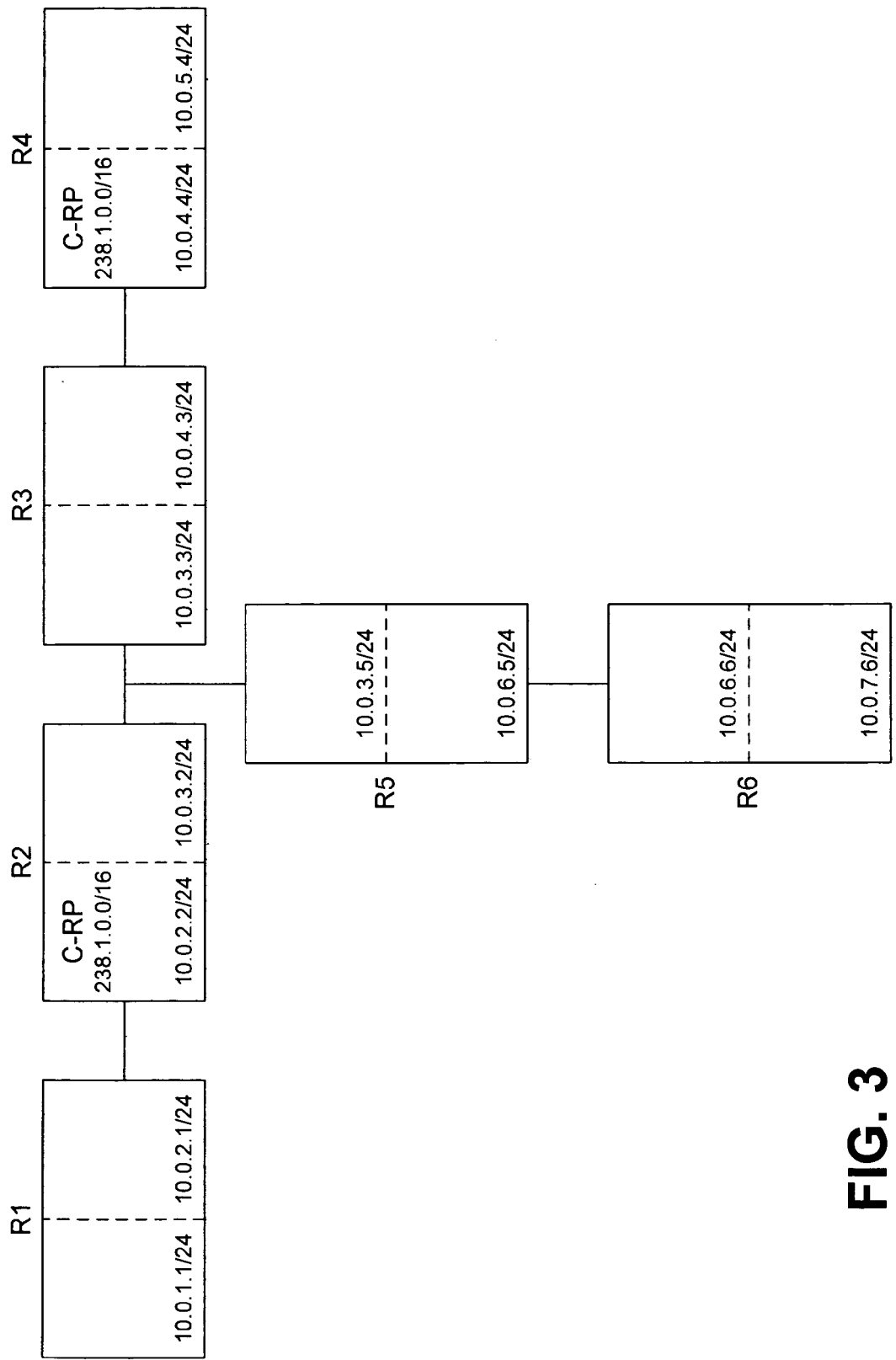
FIG. 3 is a block diagram of a plurality of routers within a domain illustrating propagation of information regarding discovered candidate rendezvous points.

FIG. 3 is a block diagram of an example configuration of routers within a domain that is presented for the purpose of explaining an embodiment of a method for propagating information as to which routers within the domain are C-RPs, i.e., identifying "discovered" C-RPs to other routers. As indicated in FIG. 3, the domain comprises six routers labeled R1, R2, R3, R4, R5, and R6. Each router comprises two interfaces identified by the dashed lines that divide each router into two halves. The two interfaces can pertain to two different virtual local area networks (VLANs), each having a different internet protocol (IP) address. For example, router R1 is associated with VLAN 10.0.1.0/24 and 10.0.2.0/24, while router R2 is associated with VLAN 10.0.2.0/24 and 10.0.3.0/24. As is further indicated in FIG. 3, each router is linked to at least one neighboring router and therefore can directly communicate with the one or more neighboring routers. For example, router R1 is linked to router R2, while router R2 is linked to each of routers R1, R3, and R5. In such an arrangement, router R1 can only directly communicate with router R2 while router R2 can directly communicate with each of routers R1, R3, and R5.

With further reference to FIG. 3, there are two C-RPs within the domain: one C-RP on router R2 and one C-RP on router R4. Each C-RP advertises the same group multicast address range, namely 238.1.0.0/16. Therefore, either of router R2 or R4 may function as the RP for the identified address range.

Each router maintains a listing of G-RP mappings for the domain and periodically sends the listing out from each of its interfaces (e.g., VLANs) in message form. Each mapping or entry within the listing and the messages has the following format:

[C-RP IP address, Group IP address/mask]

Therefore, each mapping identifies a C-RP by its IP address as well as the group multicast addresses it serves. For example, once a steady state has been achieved in the example arrangement of FIG. 3, each router will comprise an RP-Set that includes the following two mappings:

[10.0.2.2, 238.1.0.0/16]
[10.0.4.4, 238.1.0.0/16]

Initialization of the domain for multicasting will now be discussed. Once routers, such as router R2 and R4, are designated as C-RPs, for example by entering a C-RP designation command in a command line of the router, those routers will communicate their C-RP status to their neighbor routers. For router R2, the C-RP designation is communicated to routers R1, R3, and R5. For router R4, the C-RP designation is communicated to router R3. By way of example, the designations are communicated to the neighbor routers with an RP-Set message that contains all mappings that are stored on the routers and are therefore reflective of all C-RPs that are known by the routers. In the initialization case for the domain of FIG. 3, router R2 only knows about itself as a C-RP and router R4 only knows about itself as a C-RP. Therefore, the RP-Set stored on router R2 only contains the mapping [10.0.2.2, 238.1.1.0/16] and the RP-Set stored on router R4 only contains the mapping [10.0.4.4, 238.1.1.0/16]. Similarly then, the RP-Set message sent by router R2 only contains the mapping [10.0.2.2, 238.1.1.0/16] and the RP-Set message sent by router R4 only contains the mapping [10.0.4.4, 238.1.1.0/16]. Those messages are sent out on a periodic basis. By way of example, the periodic message interval is 5 seconds. Notably, every other router in the domain also sends periodic RP-Set messages to its neighbor routers. In the initialization case, however, the other routers have no mappings to convey.

Messages are transmitted and received between the routers in the domain until each router learns of the C-RPs on router R2 and R4. For example, router R4 identifies the C-RP on router R4 to router R3, which identifies the C-RP on router R-4 to routers R2 and R5, which identify the C-RP on router R4 to routers R1 and R6, respectively. Similarly, router R2 identifies the C-RP on router R2 to router R1, R3, and R5, and router R3 identifies the C-RP on router R2 to router R4 while router R5 identifies the C-RP on router R2 to router R6. Therefore, through propagation of RP-Set messages, each router in the domain will ultimately contain the same RP-Set comprising [10.0.0.2, 238.1.0.0/16] and [10.0.4.4, 238.1.0.0/16].

Notably, acceptance of each mapping contained in a received message is dependent upon a "shortest-path" rule. In particular, any given mapping contained within the message will only be accepted if the router that sent the message is along the shortest path to the C-RP described by the mapping. In other words, the mapping is only accepted from the sending router if the sending router lies along the communication path between the receiving router and the C-RP. For example, a message from router R2 that contains a mapping identifying the C-RP on router R4 will be ignored by router R5 given that router R2 does not lie along the shortest path between router R5 and router R4. A mapping identifying the C-RP on router R2, however, will be accepted by router R5. Furthermore, router R5 will ignore a mapping identifying the C-RP on router R2 in a message received from router R3, but will accept a mapping identifying the C-RP on router R4 in a message from router R3. In such a manner, packet duplication can be reduced and a single copy of an instruction will be treated as an authoritative copy. In some embodiments, the shortest path is determined by each router using a next-hop lookup for the C-RP IP address based upon a unicast routing table. If the next hop matches the source IP address of a received message, the router will use the mapping to update its RP-Set.

Figure 4:
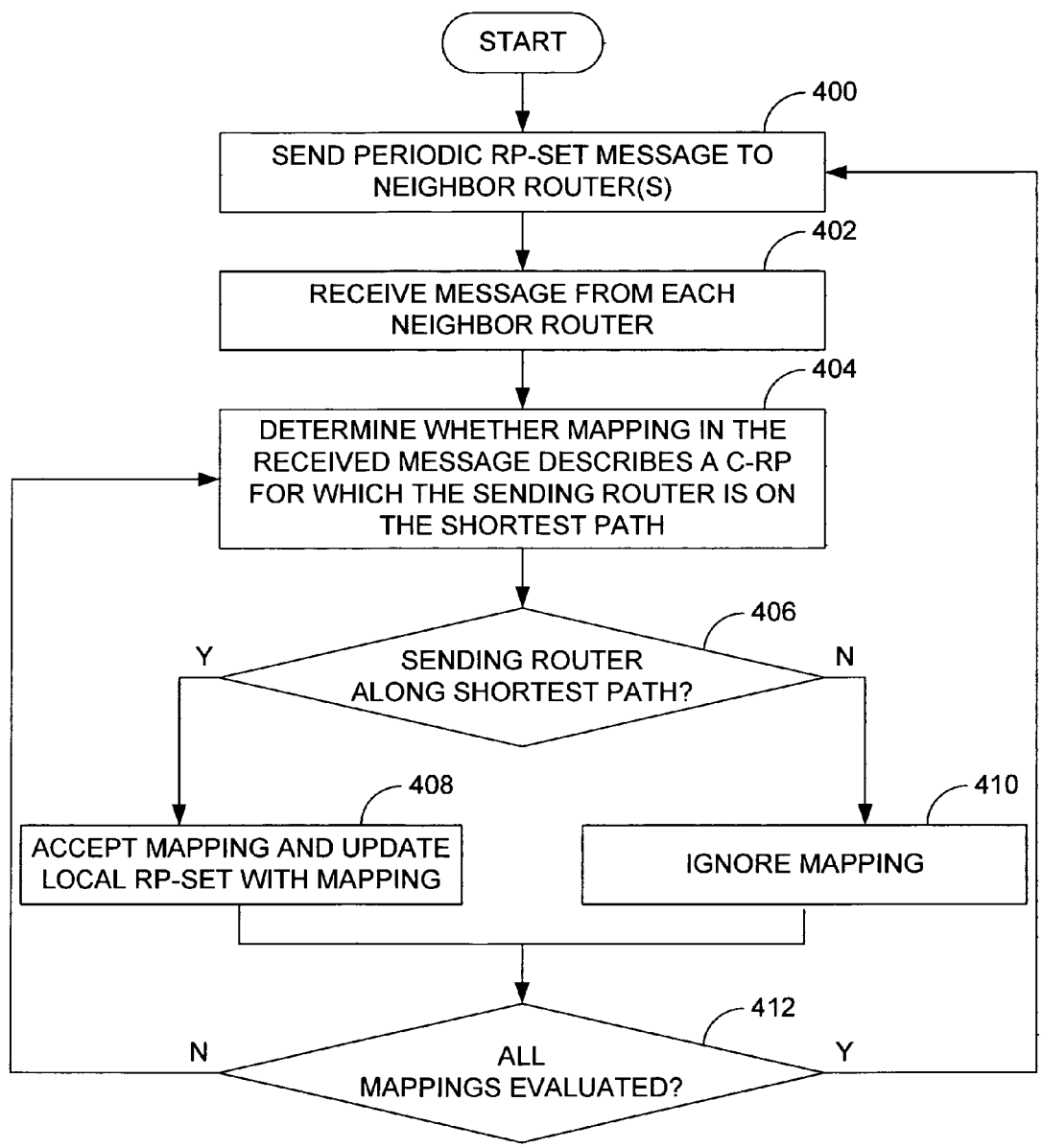
FIG. 4 is a block diagram of an embodiment of a method for propagating information regarding discovered candidate rendezvous points.

FIG. 4 is a flow diagram of an example method for configuring a network for multicasting and, more particularly, for propagating C-RP designations in accordance with the above discussion. In some embodiments, the method of FIG. 4 can be performed by any router in the domain. Beginning with block 400, the router sends a periodic RP-Set message to its neighbor router or routers. As described above, the message will contain mappings for any C-RPs that the router knows about, i.e., all mappings contained in the router's local RP-Set. Next, with reference to block 402, the router receives a message from each of its neighbor routers, either simultaneously or at different times. The received messages are of the same general format as the message sent out by the router in block 400 and therefore contain mappings for any of the C-RPs known by the sending routers. Next, as to each message, the router determines whether a mapping contained in the received message describes a C-RP for which the sending router is on the shortest path, as indicated in block 404. Referring to decision block 406, if the router that sent the message is on the shortest path between the receiving router and the C-RP, flow continues to block 408 at which the mapping is accepted and therefore used to update the router's local RP-Set. Notably, if the mapping is already present in the router's local RP-Set, the mapping is reaffirmed or refreshed and therefore is not technically "added" to the RP-Set. With reference again to decision block 406, if the sending router is not on the shortest path to the C-RP flow continues to block 410 at which the mapping is ignored by the router.

Irrespective of whether the mapping contained in the received message was accepted or ignored, flow continues to decision block 412 at which it is determined whether all mappings contained in the received message have been evaluated. If not, flow returns to block 404 at which the next mapping of the message is evaluated in accordance with the process described in relation to blocks 404 and 406. If all mappings have been considered, however, flow returns to block 400 at which a new periodic message is sent out by the router to its neighbor router or routers. By way of example, the above process is performed by each router every 5 seconds.

Figure 5:
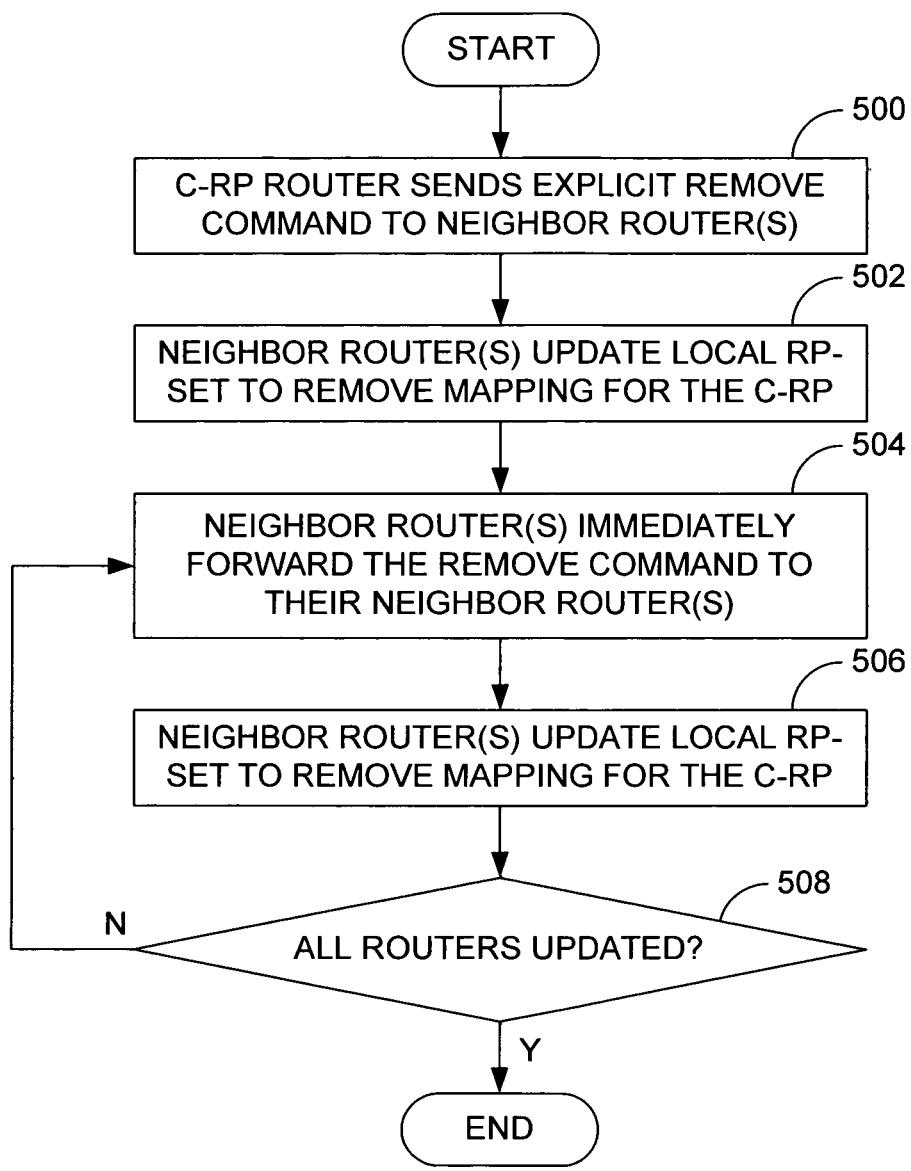
FIG. 5 is a block diagram of an embodiment of a method for propagating information regarding an expired candidate rendezvous point.

Described above is the addition (or refreshing) of mappings in router RP-Sets. It is noted that removal of mappings can be achieved in a similar manner. Specifically, if a router that was designated as a C-RP changes status and is no longer a C-RP, for example the C-RP status expires or the router is about to perform a controlled shut down, the mapping for that C-RP can be removed from each router's local RP-Set through propagation of messages between the routers of the domain. Therefore, the router on which the C-RP exists can send its periodic message to its neighbor routers with an explicit "remove" command. However, given that it is desirable to remove the C-RP designation from the other routers quickly, the remove command is immediately forwarded on by the other routers instead of being transmitted along with the routers' periodic message. FIG. 5 illustrates an embodiment of such a process.

Beginning with block 500 of FIG. 5, the router on which the C-RP that is to expire, i.e., the C-RP router, sends an explicit remove command to its neighbor router or routers. Next, the neighbor routers update their local RP-Sets to remove the mapping to the C-RP, as indicated in block 502. The neighbor routers then immediately forward the remove command to their neighbor routers, as indicated in block 504, to cause those neighbor routers to update their local RP-Sets to remove the mapping to the C-RP, as indicated in block 506. With reference to decision block 508, if not all routers have been updated, flow returns to block 504 and the updating and forwarding of the remove commands continue in the manner described above until such time when each router in the domain has been updated to remove the mapping to the expiring or expired C-RP.

Notably, the remove commands described above can be accepted or ignored in similar manner to the method described in relation to FIG. 4. Therefore, the shortest path rule can be applied by a router that receives a remove command to determine whether to remove the C-RP identified in the command or disregard the command.

Described thus far have been updating local RP-Sets when a C-RP is discovered or is being intentionally expired. However, circumstances may arise in which the router that has been designated as a C-RP fails, for example if the router crashes or loses connection to the network. In such a case, no explicit remove message will be sent by the C-RP router and a recovery must be performed to update the RP-Sets to reflect loss of the C-RP router. Such a scenario is described in relation to FIG. 6.

Figure 6:
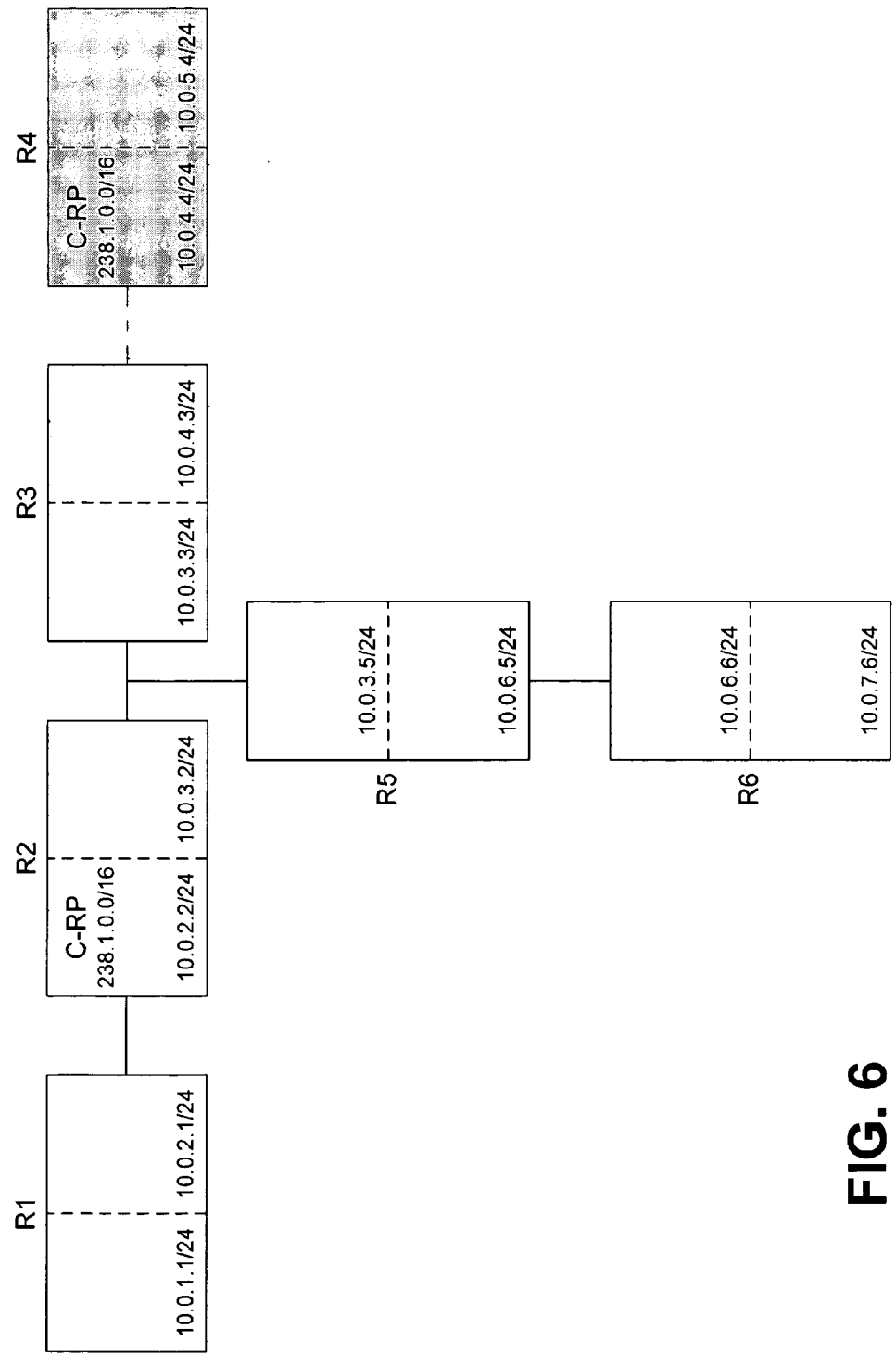
FIG. 6 is a block diagram of a plurality of routers within a domain illustrating propagation of information regarding unavailability of known candidate rendezvous points.

FIG. 6 is a block diagram of an example configuration of routers within a domain. As in the domain shown in FIG. 3, the domain illustrated in FIG. 6 comprises six routers, routers R1, R2, R3, R4, R5, and R6, each comprising two interfaces that pertain to two different VLANs. In FIG. 6, however, the connection between router R4 and the network has been broken, as indicated by a broken line. The broken connection can be the result of several different circumstances. For example, the connection can have been broken due to a breakdown in the link between router R4 and router R3. Alternatively, the connection can have been broken due to a serious failure of router R4. Regardless of the reason for the broken connection, router R4 can no longer act as a C-RP for the domain. In such a case, the entry for the C-RP on router R4 must be removed from the RP-Sets of each of routers R1, R2, R3, R5, and R6.

As mentioned above, router R4 will not be able to affirmatively signal to the other routers that it is no longer available in a failure scenario. Therefore, the new unavailability of the C-RP on router R4 must be discovered through other means. Given that each router expects periodic messages that confirm the continued existence and availability of their neighbor router, each router can discover the new unavailability of a neighbor router when messages are no longer received from the router. Therefore, in the example of FIG. 6, router R3 will be the first router to discover that router R4, and its associated C-RP, is no longer available when router R3 no longer receives messages from router R4. In such a case, router R3 will presume that router R4, and its C-RP, is no longer available. Although such a presumption can be made after the periodic message interval used by router R4 has passed without receiving a message from router R4, an additional delay can be used to account for network traffic delays and the like. Accordingly, in some embodiments, the neighbor router (router R3 in this example) will wait 2.5 times the periodic message interval before concluding that the other router (router R4 in this example) is no longer available.

Once router R3 determines that the C-RP on router R4 is unavailable, router R3 immediately issues a remove command to its neighbor routers, i.e., routers R2 and R5, which in turn issue similar remove commands to their neighbor routers and so forth until all routers within the domain have been updated to remove the mapping to the C-RP on router R4 from their local RP-Sets.

Figure 7:
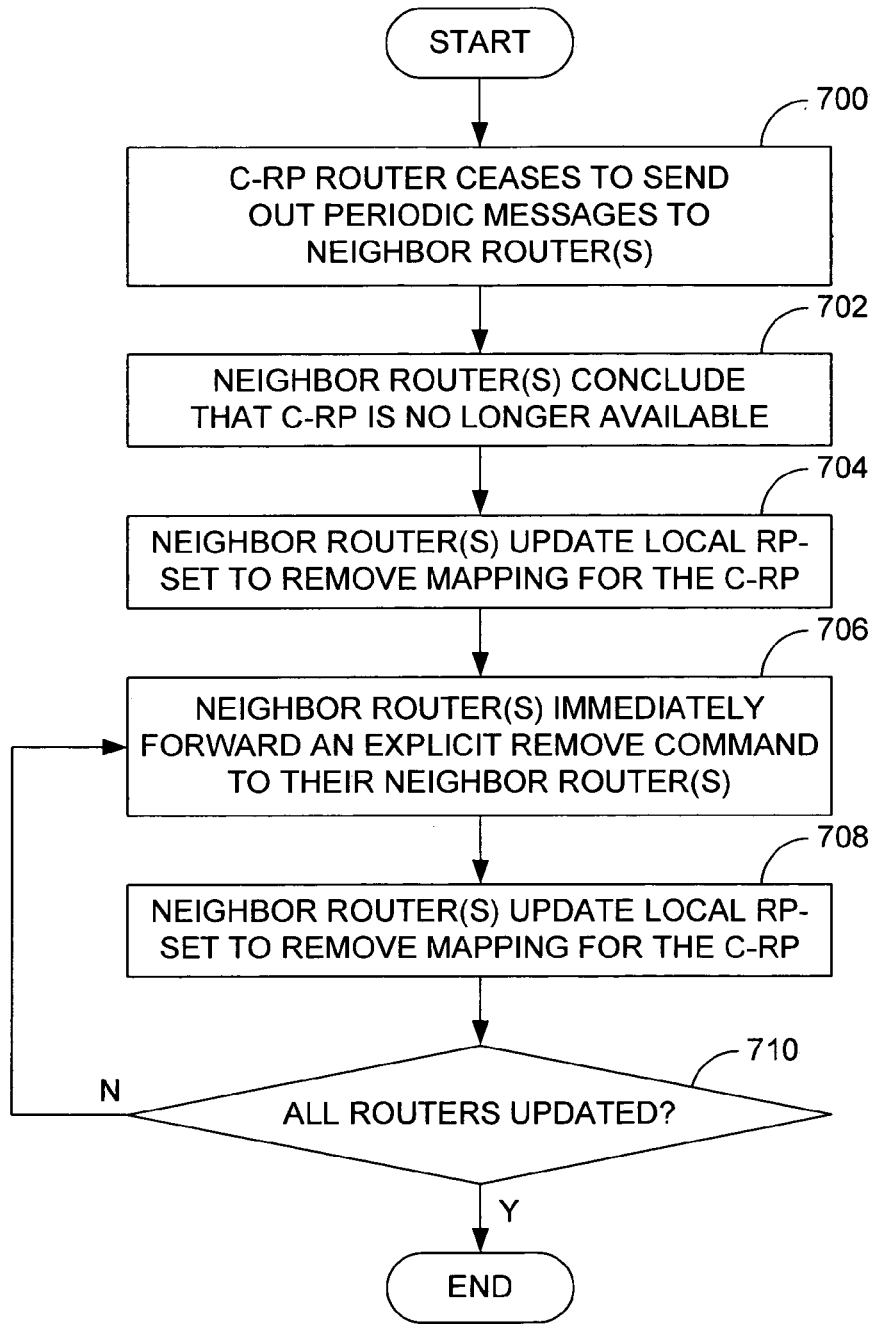
FIG. 7 is a block diagram of an embodiment of a method for propagating information regarding an unavailable candidate rendezvous point.

FIG. 7 is a flow diagram of an example method for configuring a network for multicasting and, more particularly, for removing C-RP designations in accordance with the above discussion. Beginning with block 700, a router that comprises a C-RP ceases to send out periodic messages to its neighbor router or routers. After a given time period has passed with no messages received from the C-RP router, the neighbor routers conclude that the C-RP router is no longer available, as indicated in block 702.

Next, with reference to block 704, the neighbor routers update their local RP-Sets to remove the mapping to the C-RP. The neighbor routers then immediately forward an explicit remove command to their neighbor routers, as indicated in block 706, to cause those neighbor routers to update their local RP-Sets to remove the mapping to the C-RP, as indicated in block 708. With reference to decision block 710, if not all routers have been updated, flow returns to block 706 and the updating and forwarding of the remove command continue in the manner described above until such time when each router in the domain has been updated to remove the mapping to the unavailable C-RP.

As with the explicit removal case described above in relation to FIG. 5, the remove commands described above in relation to FIG. 7 can be accepted or ignored in accordance with the shortest path rule. Therefore, the determination as to whether to remove the C-RP identified in the command can be made in relation to whether the router that sent the command is along the shortest path to the C-RP.

Figure 8:
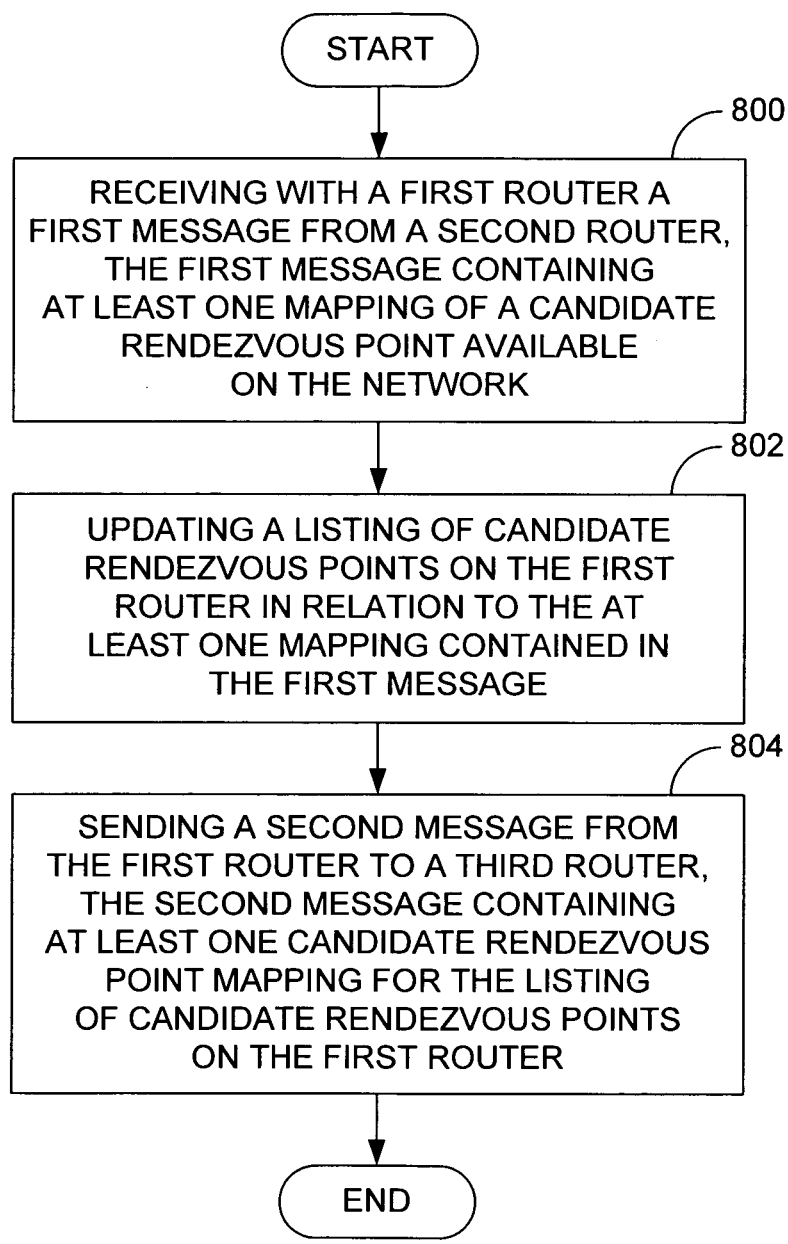
FIG. 8 is a flow diagram of an embodiment of a method for configuring a network for multicasting.

FIG. 8 illustrates an example method for configuring a network for multicasting. The method of FIG. 8 comprises receiving with a first router a first message from a second router, the first message containing at least one mapping of a candidate rendezvous point available on the network (800), updating a listing of candidate rendezvous points on the first router in relation to the at least one mapping contained in the received message (802), and sending a second message from the first router to a third router, the second message containing at least one candidate rendezvous point mapping from the listing of candidate rendezvous points on the first router (804).

Figure 9:
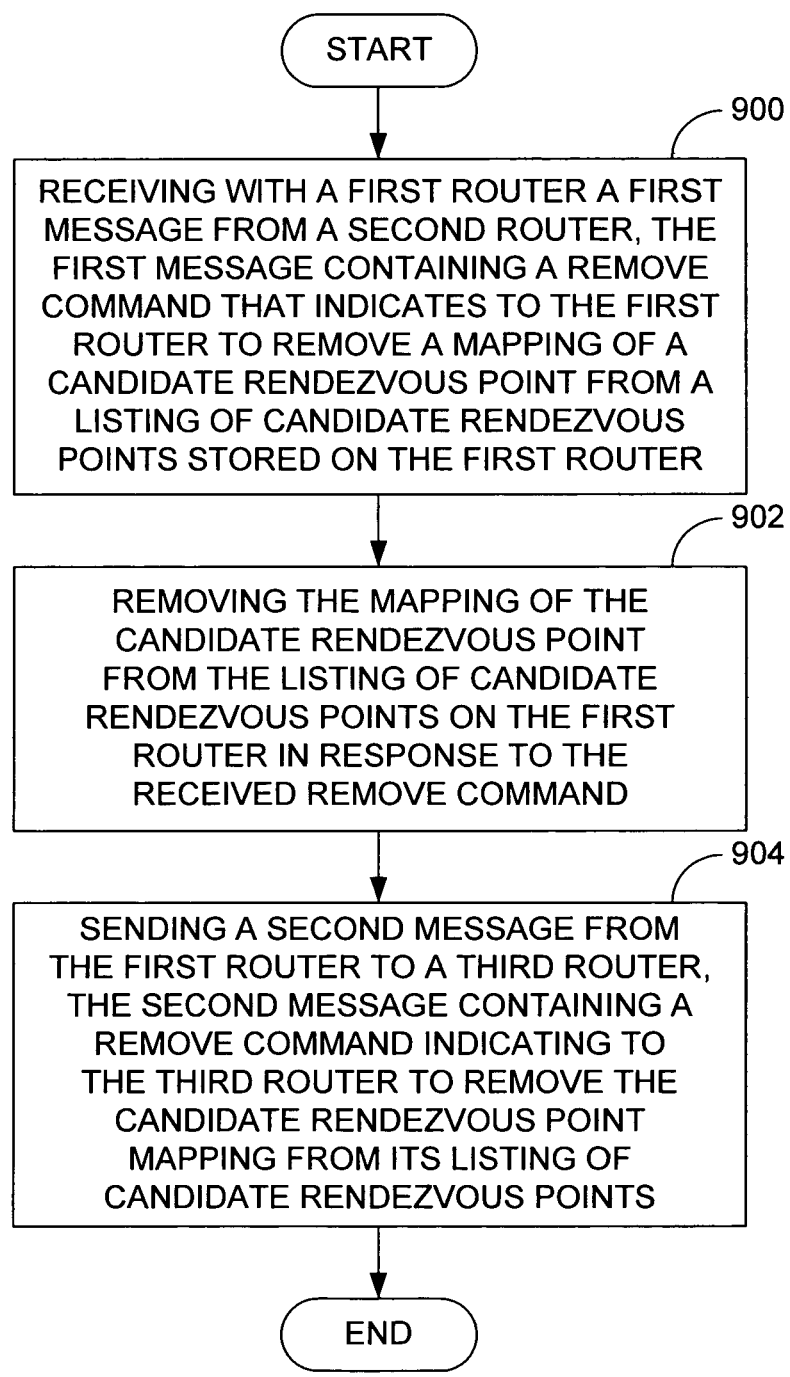
FIG. 9 is a flow diagram of a further embodiment of a method for configuring a network for multicasting.

FIG. 9 illustrates an example method for configuring a network for multicasting. The method of FIG. 9 comprises receiving with a first router a first message from a second router, the first message containing a remove command that indicates to the first router to remove a mapping of a candidate rendezvous point from a listing of candidate rendezvous points stored on the first router (900), removing the mapping of the candidate rendezvous point from the listing of candidate rendezvous points on the first router in response to the received remove command (902), and sending a second message from the first router to a third router, the second message containing a remove command indicating to the third router to remove the candidate rendezvous point mapping from its listing of candidate rendezvous points (904).

Although various embodiments of systems and methods for network packet capture have been described herein, those embodiments are mere example implementations of the disclosed systems and methods. Therefore, alternative embodiments are possible, each of which is intended to fall within the scope of this disclosure.

Claimed are the following:

1. A method for configuring a network in a domain for multicasting, the method comprising:
   receiving with a first router a first message from a second router, the first message containing at least one mapping of a candidate rendezvous point available on the network;
   updating a listing of candidate rendezvous points on the first router in relation to the at least one mapping contained in the first message, wherein the updating includes determining if the second router is along a shortest path between the first router and a candidate rendezvous point; and sending a second message from the first router to a third router, the second message containing at least one candidate rendezvous point mapping from the listing of candidate rendezvous points on the first router, wherein the first, second and third routers are within the domain.

2. The method of claim 1, wherein receiving a first message comprises receiving with the first router a message that contains all candidate rendezvous mappings stored by the second router in its listing of candidate rendezvous points.

3. The method of claim 1, wherein updating a listing of candidate rendezvous points comprises adding a rendezvous point mapping to the listing on the first router.

4. The method of claim 1, wherein updating a listing of candidate rendezvous points comprises refreshing a rendezvous point mapping in the listing on the first router.

5. The method of claim 1, wherein updating a listing of candidate rendezvous points further comprises only accepting the at least one mapping associated with that candidate rendezvous point if the second router is along the shortest path.

6. The method of claim 1, further comprising the third router updating a listing of candidate rendezvous points on the third router in relation to the at least one mapping contained in the second message it received from the first router and sending a third message from the third router to a fourth router, the third message containing at least one candidate rendezvous point mapping from the listing of candidate rendezvous points on the third router.

7. A system for configuring a network in a domain for multicasting, the system comprising:

means for receiving with a first router a first message from a second router, the first message containing at least one mapping of a candidate rendezvous point available on the network;

means for updating a listing of candidate rendezvous points on the first router in relation to the at least one mapping contained in the first message, wherein the updating further includes determining if the second router is along a shortest path between the first router and a candidate rendezvous point; and means for sending a second message from the first router to a third router, the second message containing at least one candidate rendezvous point mapping from the listing of candidate rendezvous points on the first router, wherein the first, second and third routers are within the domain.

8. The system of claim 7, wherein the means for updating a listing of candidate rendezvous points comprise means for adding a rendezvous point mapping to the listing on the first router.

9. The system of claim 7, wherein the means for updating a listing of candidate rendezvous points comprise means for refreshing a rendezvous point mapping in the listing on the first router.

10. The system of claim 7, wherein the means for updating a listing of candidate rendezvous points further comprise only accepting the at least one mapping associated with that candidate rendezvous point if the second router is along the shortest path.

11. A router for use within a network of a domain in which multicasting is performed, the router comprising:

a processing unit; and memory connected to the processing unit, the memory including a multicasting manager configured to receive with a first router a first message from a second router, the first message containing at least one mapping of a candidate rendezvous point available on the network, to update a listing of candidate rendezvous points in relation to the at least one mapping contained in the first message, wherein the updating the listing further includes determining whether the second router is along a shortest path between itself and a candidate rendezvous point, and to send a second message to a third router, the second message containing at least one candidate rendezvous point mapping from the listing of candidate rendezvous points, wherein the first, second and third routers are within the domain.

12. The router of claim 11, wherein the multicasting manager is configured to receive a message that contains all candidate rendezvous mappings stored by the second router in its listing of candidate rendezvous points.

13. The router of claim 11, wherein the multicasting manager is configured to add a rendezvous point mapping to the listing on the first router.

14. The router of claim 11, wherein the multicasting manager is configured to refresh a rendezvous point mapping into the listing on the first router.

15. The router of claim 11, wherein the multicasting manager is configured to only accept the at least one mapping associated with that candidate rendezvous point if the second router is along the shortest path.

16. A method for configuring a network in a domain for multicasting, the method comprising:

receiving with a first router a first message from a second router, the first message containing a remove command that indicates to the first router to remove a mapping of a candidate rendezvous point from a listing of candidate rendezvous points stored on the first router;

determining by the first router whether the second router is along a shortest path between the first router and a candidate rendezvous point;

removing the mapping of the candidate rendezvous point from the listing of candidate rendezvous points on the first router in response to the received remove command; and sending a second message from the first router to a third router, the second message containing a remove command indicating to the third router to remove the candidate rendezvous point mapping from its listing of candidate rendezvous points, wherein the first, second and third routers are within the domain.

17. The method of claim 16, wherein receiving a remove command from a second router comprises receiving a remove command from a router that is the candidate rendezvous point.

18. The method of claim 16, wherein sending a second message comprises immediately sending the second message from the first router to the third router upon receiving the first message from the second router.

19. The method of claim 16, further comprising only accepting the remove command if the second router is along the shortest path.

20. The method of claim 16, further comprising removing a mapping of the candidate rendezvous point from a listing of candidate rendezvous points on the third router in response to the remove command received from the first router and sending a third message from the third router to a fourth router, the third message containing a remove command indicating to the fourth router to remove the candidate rendezvous point mapping from its listing of candidate rendezvous points.

21. The method of claim 16, further comprising the second router concluding that the candidate rendezvous point has failed after no longer receiving periodic messages from a further router that is the candidate rendezvous point and sending the first message to the first router in response to drawing that conclusion.

22. A system for configuring a network in a domain for multicasting, the system comprising:
  means for receiving with a first router a first message from a second router, the first message containing a remove command that indicates to the first router to remove a mapping of a candidate rendezvous point from a listing of candidate rendezvous points stored on the first router;
  means for the first router determining if the second router is along a shortest path between the first router and a candidate rendezvous point;
  means for removing the mapping of the candidate rendezvous point from the listing of candidate rendezvous points on the first router in response to the received remove command; and
  means for sending a second message from the first router to a third router, the second message containing a remove command indicating to the third router to remove the candidate rendezvous point mapping from its listing of candidate rendezvous points,
  wherein the first, second and third routers are within the domain.

23. The system of claim 22, wherein the means for sending a second message comprise means for immediately sending the second message from the first router to the third router upon receiving the first message from the second router.

24. The system of claim 22, wherein the means for the first router determining further comprising only accepting the remove command if the second router is along the shortest path.

25. A router for use within a network of a domain in which multicasting is performed, the router comprising:
  a processing unit; and
  memory connected to the processing unit, the memory including a multicasting manager configured to receive at a first router a first message from a second router, the first message containing a remove command that indicates to the first router to remove a mapping of a candidate rendezvous point from a listing of candidate rendezvous points stored on the first router, to determine if the second router is along a shortest path between the first router and a candidate rendezvous point, to remove the mapping of the candidate rendezvous point from the listing of candidate rendezvous points on the first router in response to the received remove command, and to send a second message from the first router to a third router, the second message containing a remove command indicating to the third router to remove the candidate rendezvous point mapping from its listing of candidate rendezvous points,
  wherein the first, second and third routers are within the domain.

26. The router of claim 25, wherein the multicasting manager is configured to send a second message immediately to the third router upon receiving the first message from the second router.

27. The router of claim 25, wherein the multicasting manager is configured to only accept the remove command if the second router is along the shortest path.

28. A computer-readable storage device that stores a multicasting manager for use on a first router in a domain, the manager comprising:
  logic configured to receive at a first router a first message from a second router in the domain, the first message containing at least one mapping of a first candidate rendezvous point available on the network;
  logic configured to update a listing of candidate rendezvous points stored on the first router in relation to the at least one mapping contained in the first message, the updating of the listing further including determining if the second router is along a shortest path between itself and a candidate rendezvous point and to only accept the at least one mapping associated with that candidate rendezvous point if the second router is along the shortest path;
  logic configured to send a second message from the first router to a third router in the domain, the second message containing at least one candidate rendezvous point mapping from the listing of candidate rendezvous points stored on the first router;
  logic configured to receive at the first router a third message from the second router, the third message containing a remove command that indicates to the first router to remove a mapping of a second candidate rendezvous point from the listing of candidate rendezvous points stored on the first router;
  logic configured to remove the mapping of the second candidate rendezvous point from the listing of candidate rendezvous points stored on the first router in response to the third message; and
  logic configured to send a fourth message from the first router to the third router, the fourth message containing a remove command indicating to the third router to remove the second candidate rendezvous point mapping from its listing of candidate rendezvous points,
  wherein the first, second and third routers are within the domain.

* * * * *